(12) United States Patent
Ford, III

(10) Patent No.: US 12,221,278 B2
(45) Date of Patent: Feb. 11, 2025

(54) INTEROPERABLE PREFABRICATED MOBILE STRUCTURE

(71) Applicant: Irish Dawg Industries, LLC, Stuart, FL (US)

(72) Inventor: Harry Ralph Ford, III, Stuart, FL (US)

(73) Assignee: Irish Dawg Industries, LLC, Stuart, FL (US)

( * ) Notice: Subject to any disclaimer, the term of this patent is extended or adjusted under 35 U.S.C. 154(b) by 0 days.

(21) Appl. No.: 18/227,250

(22) Filed: Jul. 27, 2023

(65) Prior Publication Data

US 2024/0034552 A1 Feb. 1, 2024

Related U.S. Application Data

(60) Provisional application No. 63/392,774, filed on Jul. 27, 2022.

(51) Int. Cl.
*B65D 90/00* (2006.01)
*B65D 67/02* (2006.01)
*B65G 67/02* (2006.01)

(52) U.S. Cl.
CPC ..... *B65D 90/0013* (2013.01); *B65D 90/0026* (2013.01); *B65G 67/02* (2013.01); *B65D 2588/12* (2013.01); *B65D 2590/0025* (2013.01)

(58) Field of Classification Search
CPC ............ B65D 90/0013; B65D 90/0026; B65D 2588/12; B65D 2590/0025; B65G 67/02
See application file for complete search history.

(56) References Cited

U.S. PATENT DOCUMENTS

| 2,499,498 A | 3/1950 | Hammond, Jr. |
| 3,553,823 A | 1/1971 | Torsten |

(Continued)

FOREIGN PATENT DOCUMENTS

| CA | 2854516 | 5/2015 |
| DE | 202009002015 U1 | 8/2010 |

(Continued)

OTHER PUBLICATIONS

Final Office Action, dated Nov. 23, 2021, from corresponding U.S. Appl. No. 17/214,050.

(Continued)

*Primary Examiner* — Saul Rodriguez
*Assistant Examiner* — Ashley K Romano
(74) *Attorney, Agent, or Firm* — Thomas Horstemeyer, LLP

(57) ABSTRACT

A prefabricated mobile structure (e.g., substantially in the shape of a rectangular prism) that is substantially shorter than a standard 20-foot shipping container. The mobile structure includes an extension member extending outwardly from each respective upper corner of the structure substantially parallel to the structure's primary axis. Each extension member comprises an attachment point that is adapted to connect with a support portion of a spreader configured to engage with corner fittings of a standard 20-foot freight container. The respective extension members effectively extend the length of the attachment profile of the mobile structure while maintaining a shorter primary body portion. This may allow the prefabricated mobile structure to, for example, be lifted by a lifting device, such as a spreader, that is adapted for lifting a standard 20-foot shipping container while the prefabricated mobile structure's body remains compact enough to be loaded onto a CROP sled for transport.

25 Claims, 11 Drawing Sheets

(56) References Cited

U.S. PATENT DOCUMENTS

| | | | |
|---|---|---|---|
| 3,623,296 | A | 11/1971 | Joseph |
| 3,754,516 | A | 8/1973 | Van Gompel |
| 3,963,290 | A | 6/1976 | Rennemann |
| 4,049,149 | A | 9/1977 | Durenec |
| 4,305,505 | A | 12/1981 | Hickey |
| 4,521,941 | A | 6/1985 | Gerhard |
| 4,766,708 | A | 8/1988 | Sing |
| 4,875,814 | A | 10/1989 | Weller |
| 4,910,932 | A | 3/1990 | Honigman |
| 5,072,845 | A | 12/1991 | Grogan |
| 5,171,113 | A | 12/1992 | Hove |
| 5,706,614 | A | 1/1998 | Wiley, Jr. et al. |
| 6,105,511 | A | 8/2000 | Bridges |
| 6,220,468 | B1 | 4/2001 | Lee |
| 6,926,482 | B2 | 8/2005 | Gohlke |
| 7,185,779 | B2 | 3/2007 | Payne |
| 7,507,061 | B2 | 3/2009 | Wells et al. |
| D625,529 | S | 10/2010 | Grainger |
| 7,823,338 | B2 | 11/2010 | Slagel et al. |
| 8,066,134 | B2 | 11/2011 | Davidson |
| 8,157,491 | B2 * | 4/2012 | Pavlov .................. E01F 13/12 410/46 |
| 8,556,112 | B2 | 10/2013 | Tujague, Sr. et al. |
| 8,763,314 | B2 | 7/2014 | Yoo |
| 8,881,934 | B2 | 11/2014 | Tujague, Sr. et al. |
| 9,422,083 | B1 | 8/2016 | Embleton et al. |
| 9,499,334 | B2 | 11/2016 | Disorbo |
| 9,617,748 | B2 | 4/2017 | Wilson et al. |
| 9,738,402 | B2 * | 8/2017 | Brown ...................... B64C 1/20 |
| 9,966,739 | B2 | 5/2018 | Chen et al. |
| 10,340,697 | B2 | 7/2019 | Paine et al. |
| 10,549,908 | B2 | 2/2020 | Kochanowski |
| 10,704,251 | B1 | 7/2020 | Rubler |
| 10,865,040 | B2 | 12/2020 | Oltman et al. |
| 11,254,494 | B2 * | 2/2022 | Ford, III ............ B65D 90/0053 |
| 11,274,446 | B2 | 3/2022 | Wakiyama et al. |
| 11,440,660 | B1 * | 9/2022 | Karni ..................... B64D 9/003 |
| D1,001,716 | S * | 10/2023 | Buscema .................... D12/406 |
| 2004/0018067 | A1 * | 1/2004 | Taylor .................. B65D 88/14 410/46 |
| 2005/0193643 | A1 | 9/2005 | Pettus |
| 2007/0056967 | A1 | 3/2007 | Dobrinski et al. |
| 2009/0032530 | A1 | 2/2009 | Chu |
| 2009/0084800 | A1 | 4/2009 | Hartley et al. |
| 2010/0089917 | A1 | 4/2010 | Gilbert et al. |
| 2010/0147842 | A1 | 6/2010 | Reynard et al. |
| 2010/0191615 | A1 | 7/2010 | Thomas |
| 2012/0006369 | A1 | 1/2012 | Cantin et al. |
| 2018/0050862 | A1 | 2/2018 | Wu et al. |
| 2018/0237216 | A1 | 8/2018 | Saer |
| 2020/0154596 | A1 | 5/2020 | Roy |
| 2021/0198888 | A1 | 7/2021 | Unger |

FOREIGN PATENT DOCUMENTS

| | | |
|---|---|---|
| DE | 202013012030 U1 | 12/2014 |
| DE | 102017111609 B3 | 10/2018 |
| FR | 1291776 A | 4/1962 |
| GB | 2415444 A | 12/2005 |
| WO | 2007090061 A2 | 8/2007 |
| WO | 2009105050 A1 | 8/2009 |
| WO | 2014128120 A2 | 8/2014 |

OTHER PUBLICATIONS

Notice of Allowance, dated Jan. 25, 2023, from corresponding U.S. Appl. No. 17/521,272.
Notice of Allowance, dated Jul. 14, 2021, from corresponding U.S. Appl. No. 17/214,063.
Notice of Allowance, dated Jun. 2, 2023, from corresponding U.S. Appl. No. 17/675,845.
Notice of Allowance, dated Mar. 19, 2021, from corresponding U.S. Appl. No. 16/824,952.
Notice of Allowance, dated Oct. 6, 2021, from corresponding U.S. Appl. No. 16/824,941.
Office Action, dated Apr. 5, 2021, from corresponding U.S. Appl. No. 16/824,941.
Office Action, dated Jan. 6, 2023, from corresponding U.S. Appl. No. 17/675,845.
Office Action, dated Jul. 14, 2021, from corresponding U.S. Appl. No. 17/214,050.
Office Action, dated Nov. 13, 2020, from corresponding U.S. Appl. No. 16/824,952.
Office Action, dated Nov. 9, 2020, from corresponding U.S. Appl. No. 16/824,945.
Office Action, dated Oct. 29, 2020, from corresponding U.S. Appl. No. 16/824,941.
Office Action, dated Sep. 29, 2022, from corresponding U.S. Appl. No. 17/521,272.
Restriction Requirement, dated Aug. 7, 2020, from corresponding U.S. Appl. No. 16/824,945.
Restriction Requirement, dated Jul. 2, 2020, from corresponding U.S. Appl. No. 16/824,952.
Restriction Requirement, dated May 29, 2020, from corresponding U.S. Appl. No. 16/824,941.
Office Action, dated Mar. 18, 2024, from corresponding U.S. Appl. No. 18/316,827.

* cited by examiner

INTEROPERABLE PREFABRICATED MOBILE STRUCTURE

CROSS-REFERENCE TO RELATED APPLICATIONS

This application claims the benefit of U.S. Provisional Patent Application Ser. No. 63/392,774, filed Jul. 27, 2022, the entire disclosure of which is hereby incorporated herein by reference in its entirety.

BACKGROUND

Global shipping channels frequently rely on standardized prefabricated mobile structure sizes to simplify shipping logistics and thereby reduce shipping costs. Consequently, global shipping entities, including companies, non-governmental organizations, and governmental organizations, utilize specialized transit equipment designed to engage with standard shipping container sizes. For example, cranes, trucks, trailers, aircraft, trains, and ships may all be constructed with frames and attachment points dimensioned so as to engage with attachment points built into standardized prefabricated mobile structures, such as shipping containers. For example, shipping entities base stacking arrangements on standardized shipping container sizes, allowing some ships to hold over 20,000 standardized shipping units.

But, although standard shipping containers simplify large-scale shipping operations, they may not adequately accommodate a mobile building-like function due to cost and general design features which are more customized for shipping heavy goods. Moreover, certain military equipment designs are not compatible with the standard intermodal container sizes. For example, a PLS/M3 CROP (Container Roll-in/Out Platform) sled is too small to accommodate many standard intermodal container sizes. A mobile structure that blends the utility of a building-like structure with the ability to engage with such military equipment while being rapidly deployable is the ideal solution.

Accordingly, there is a need for prefabricated mobile structures that can serve the functions of a building while also maintaining near container-like mobility and that also (i) can fit on customized military equipment for shipping and (ii) include features to facilitate safely lifting the structure using standard shipping container lifting equipment, thereby greatly increasing the versatility and utility of the structures.

SUMMARY

It should be appreciated that this Summary is provided to introduce a selection of concepts in a simplified form that are further described below in the Detailed Description. This Summary is not intended to be used to limit the scope of the claimed subject matter.

A prefabricated mobile structure (e.g., substantially in the shape of a rectangular prism), according to various embodiments, has a body portion that is substantially shorter than that of a standard 20-foot shipping container. In various embodiments, the mobile structure includes an extension member extending outwardly from each respective upper corner of the structure substantially parallel to the structure's primary axis. Each extension member comprises an attachment point that is adapted to connect with a support portion of a spreader (or other lifting device) that is configured to engage with corner fittings of a standard 20-foot freight container. The respective extension members effectively extend the length of the mobile structure's attachment while maintaining a shorter primary body portion for the mobile structure. This may allow the prefabricated mobile structure to, for example, be lifted by a lifting device, such as a spreader, that is adapted for lifting a standard 20-foot shipping container (or other sized container that is larger than the prefabricated mobile structure) while the prefabricated mobile structure's body remains compact enough to be loaded onto a CROP sled (or other suitable support) for transport. In certain embodiments, the length of the CROP sled is less than 20 feet (e.g., less than 19 feet, less than 18.5 feet, 18 feet and 1 inch, and/or about 18 feet. In particular embodiments, the width of the CROP sled is less than 8 feet and/or about 7 feet and 5 inches wide. In particular embodiments, the length and width above reference the dimensions of the CROP sled's deck.

More specifically, according to one aspect of the disclosure, a prefabricated mobile structure includes a platform having a substantially rectangular (e.g., rectangular) shape; four vertical frame elements attached to the platform and extending upward relative to the platform; and a roof frame having a substantially rectangular (e.g., rectangular) shape, attached to the four vertical frame elements, and disposed substantially parallel to (e.g., parallel to) the platform. The roof frame includes a front transverse frame element extending between and coupled to respective ends of a first pair of the four vertical frame elements at respective front roof frame corners, wherein a front edge of the platform, the first pair of vertical frame elements, and the front transverse frame element define a front side of the prefabricated mobile structure. The roof frame also includes a rear transverse frame element extending between and coupled to respective ends of a second pair of the four vertical frame elements at respective rear roof frame corners, wherein a rear edge of the platform, the second pair of vertical frame elements, and the rear transverse frame element define a rear side of the prefabricated mobile structure. Further, the roof frame includes a left longitudinal frame element extending between and coupled to an end of a first vertical frame element of the first pair of vertical frame elements and an end of a first vertical frame element of the second pair of vertical frame elements, wherein a left edge of the platform, the left longitudinal frame element, the first vertical frame element of the first pair of vertical frame elements, and the first vertical frame element of the second pair of vertical frame elements define a left side of the prefabricated mobile structure. The roof frame also includes a right longitudinal frame element extending between and coupled to an end of a second vertical frame element of the first pair of vertical frame elements and an end of a second vertical frame element of the second pair of vertical frame elements, wherein a right edge of the platform, the right longitudinal frame element, the second vertical frame element of the first pair of vertical frame elements, and the second vertical frame element of the second pair of vertical frame elements define a right side of the prefabricated mobile structure. The prefabricated mobile structure also includes extension members respectively disposed at each front roof frame corner and each rear roof frame corner, wherein each extension member extends in a longitudinal direction beyond an adjacent transverse frame element; and each extension member comprises an attachment point.

According to another aspect of the disclosure, an extension horn for a prefabricated mobile structure includes a top plate comprising: an extension portion comprising a substantially stadium-shaped (e.g., stadium-shaped) attachment point configured to accept a twist lock mechanism; an exterior gusset substantially perpendicularly (e.g., perpendicularly) attached to the top plate and configured to mate against an exterior surface of a vertical frame element of the prefabricated mobile structure; and an interior gusset substantially perpendicularly (e.g., perpendicularly) attached to the top plate, disposed substantially parallel to (e.g., parallel to) the exterior gusset, and configured to mate against an interior surface of the vertical frame element.

According to another aspect of the disclosure, a method of moving a prefabricated mobile structure includes aligning a spreader configured to engage with corner fittings of a 20-foot freight container with attachment points on the prefabricated mobile structure; engaging twist lock mechanisms of the spreader with attachment points of the prefabricated mobile structure; lifting the prefabricated mobile structure; placing the prefabricated mobile structure base within a perimeter of a platform of a container roll-on/roll-off platform (CROP) sled; securing the prefabricated mobile structure to the CROP sled; pulling the CROP sled and prefabricated mobile structure onto a truck; transferring the CROP sled and prefabricated mobile structure onto the ground; lifting the prefabricated mobile structure off the CROP sled with a forklift; and setting the prefabricated mobile structure in a desired location.

BRIEF DESCRIPTION OF THE DRAWINGS

Various embodiments are described below. In the course of this description, reference will be made to the accompanying drawings, which are not necessarily drawn to scale, and wherein.

DETAILED DESCRIPTION OF VARIOUS EMBODIMENTS

Figure 1:
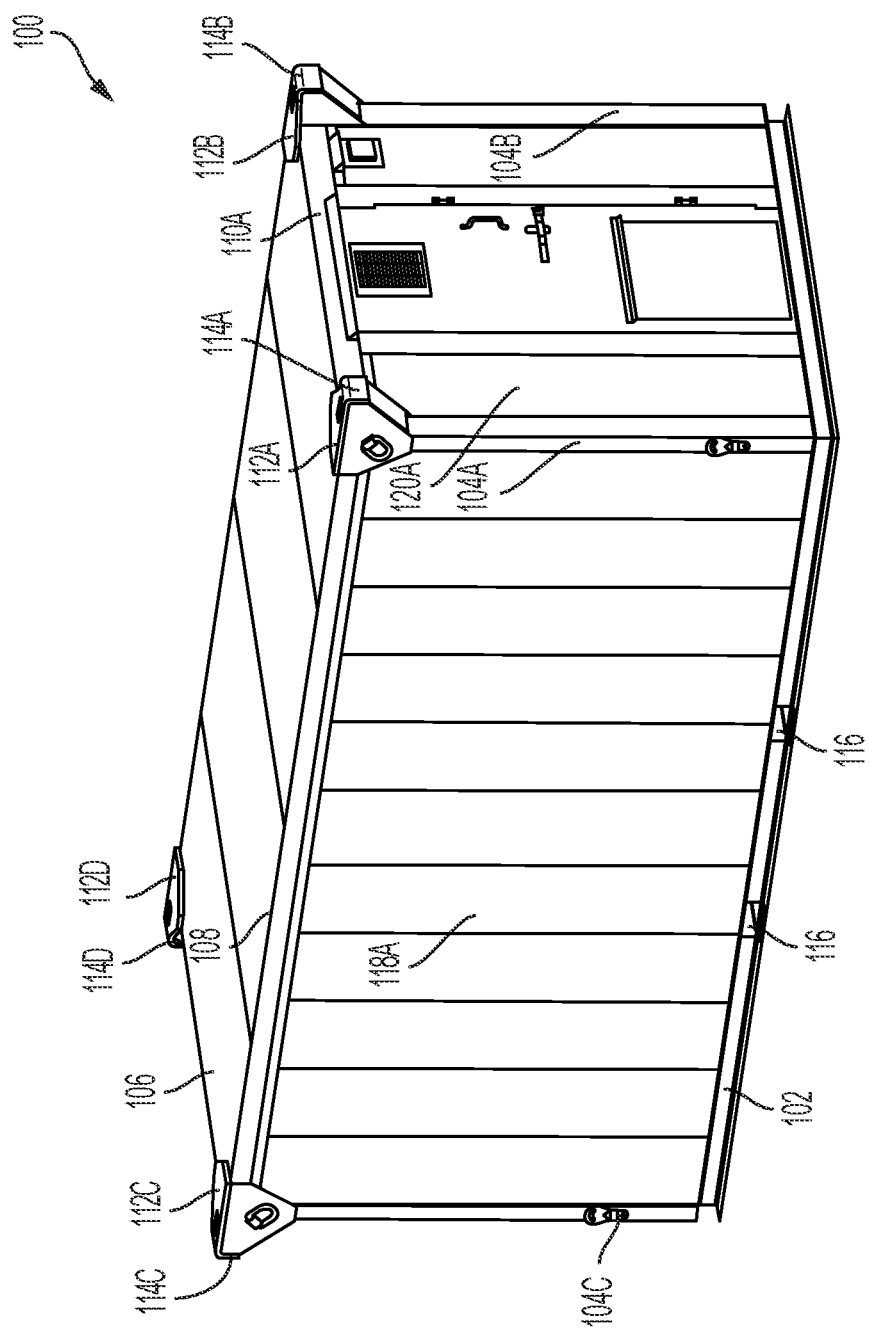
FIG. 1 is a top front perspective view of a prefabricated mobile structure according to various embodiments described herein.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

For the purposes of this disclosure, the term "prefabricated mobile structure" is used to describe a structure configured to hold goods (e.g., furnishings and working equipment). The prefabricated mobile structure may be reusable and fitted with devices for engaging with handling equipment. The prefabricated mobile structure may also engage with multiple different shipping modes (e.g., trucks, ships, trains, etc.). Because a prefabricated mobile structure may hold a plurality of items, or a large volume of a fluid, a prefabricated mobile structure may allow bulk movement of goods by aggregating multiple items into a single transferable unit, introducing economies of scale over handling many items individually. A prefabricated mobile structure may also be configured to protect shipped goods during transit from impacts, such as by providing structural cages around shipped items which prevent external forces (e.g., forklifts, shipping containers) from impacting the items. Similarly, a prefabricated mobile structure may protect goods from exposure to weather and thieves by providing walls and a roof surrounding shipped goods. In some cases, a prefabricated mobile structure may also provide preassembled working or living spaces or other functional areas as well.

For the purposes of this disclosure, the term "attachment point" is intended to refer to a physical arrangement of material that facilitates attachment of one object to another object. For example, an attachment point may comprise a portion of a first object that defines an opening for receiving fastening hardware for attaching the first object to a second object. An attachment point may also include a metal loop or hook that is attached to a first object and that is configured for being securely engaged by attachment hardware (e.g., a chain, rope, strap etc.) to attach the first object to a second object.

To enhance the benefits of economies of scale of shipping multiple items inside a single unit, many transit entities have adopted standardized prefabricated mobile structure sizes. These standardized sizes allow many different manufacturers to produce interoperable prefabricated mobile structures that can be stacked and arranged in a predictable, repeatable manner. As a result, a shipping entity can place thousands of standardized prefabricated mobile structures from different manufacturers on a single transport unit (e.g., ship, train, etc.) without expending effort to customize attachment mechanisms and transport equipment for many different manufacturers. This increases the speed of loading prefabricated mobile structures, reducing overall shipping costs.

Standardized intermodal container sizes are often promulgated by international bodies. One such standard is International Organization for Standardization (ISO) 668, which provides measurements, tare weight, gross weight, and tolerances. For example, ISO 668 specifies that a type 1CC container, commonly referred to as a 20-foot container, has a minimum internal volume of a volume of approximately 42 cubic yards, and has a maximum gross mass of 79,370 lbs. ISO 668 also specifies dimensions and placement of components on a shipping container for engagement with handling devices (e.g., cranes) and other prefabricated mobile structures in a stacked configuration.

Although many containers follow the 20-foot standard, some use cases may still require containers having different dimensions. Some such containers specified in ISO 668 include 10-, 30-, and 40-foot containers, as well as containers with varying heights. However, each of these different sized containers may require unique equipment configured to engage with lifting points at the respective container dimensions. As a result, a shipping yard configured to handle 20-foot containers (e.g., with cranes, forklifts, trailers, etc.) may be unable to process 40-foot containers. Additionally, some shipping entities may rely on prefabricated mobile structures following a different standard based on operational requirements.

For example, a military entity may have unique trucks configured to quickly load and unload a prefabricated mobile structure in an austere and potentially hostile environment. This rapid load and unload requirement may lead to specialized equipment enabling the truck to load and unload without assistance of secondary vehicles (e.g., forklifts). One such truck is a Palletized Load System (PLS). These PLS vehicles are able to attach to a container roll-on/roll-off platform (CROP) sled, and lift and drag the sled and its contents onto a PLS trailer using a crane arm extending rearward from a cab of the PLS. However, the CROP sleds are themselves designed to be shipped to a deployed location within a 20-foot shipping container. As a result, the CROP sleds are shorter than a 20-foot shipping container, and cannot securely transport a 20-foot shipping container. Items originally shipped in a 20-foot shipping container must then be repackaged in a form suitable for a CROP sled before transport downrange, wasting valuable time in potentially combative environments. Similarly, items transported in a shipping container configured to be carried on a CROP sled must be repackaged before being transported in a 20-foot shipping container. A transporting party may have to maintain equipment adapted to handle 20-foot shipping containers and equipment adapted to handle prefabricated mobile structures dimensioned to fit on a CROP sled. This may dramatically increase logistics requirements for spare parts and shipment of handling vehicles, potentially slowing responses to exigent needs (e.g., combat). This also reduces the ability of an organization to respond to emergencies, as a destination (e.g., site of a natural disaster) may only have equipment suited to one standard (e.g., cranes configured to handle prefabricated mobile structures dimensioned to fit on a CROP sled) while a transit hub may only have equipment suited to a second standard (e.g., cranes and trailers configured to handle 20 foot prefabricated mobile structures). Further still, in cases where a prefabricated mobile structure is preinstalled with equipment, wiring, access ports, and utilities, in may be impossible to equip a generic shipping container with the accessories provided in the prefabricated mobile structure to provide the same utility.

In certain embodiments, the length of a suitable CROP sled is less than 20 feet (e.g., less than 19 feet, less than 18.5 feet, 18 feet and 1 inch, and/or about 18 feet. In particular embodiments, the width of the CROP sled is less than 8 feet and/or about 7 feet and 5 inches wide. In particular embodiments, the length and width above reference the dimensions of the CROP sled's substantially planer deck, which is adapted to support the prefabricated mobile structure.

Accordingly, a prefabricated mobile structure according to certain embodiments of the present disclosure may comprise features enabling interoperability between two prefabricated mobile structure standards. For instance, a prefabricated mobile structure according to certain embodiments of the present disclosure may include top features configured to engage with cranes and other equipment following a 20-foot shipping container standard, while the prefabricated mobile structure base may include features configure to engage with forklifts, sleds, and trailers following a different standard (e.g., dimensioned to fit on a CROP sled). It should be noted that although example embodiments are discussed in the context of a 20-foot shipping container standard and a CROP sled dimension standard, other sizes are also envisioned (e.g., 10-, 30-, and 40-foot containers following ISO 668 standards, prefabricated mobile structures following other standards, or any other suitable prefabricated mobile structure). Additionally, because a prefabricated mobile structure according to certain embodiments may be configured as a portable workspace, the prefabricated mobile structure may omit certain structural features required by a standard designed to ensure that the structure can universally ship various goods, such as strength features (e.g., gussets, welds, certain frame elements, reinforcements, door configurations, etc.). These omissions may also enable the prefabricated mobile structure to be produced and shipped more economically due to reduced weight and simplified certification processes.

FIG. 1 is a top front perspective view of a prefabricated mobile structure 100 according to various embodiments described herein. In the example embodiment shown, the prefabricated mobile structure 100 may comprise a platform 102 having a substantially rectangular (e.g., rectangular) shape, and may be dimensioned so as to fit on a CROP sled (e.g., an M3 CROP sled). As a result, the platform 102 may, in some embodiments, have dimensions less than 91 inches in width and 233.27 inches in length. The prefabricated mobile structure 100 may also comprise four vertical frame elements 104 attached to the platform and extending upward relative to the platform. In some embodiments, the four vertical frame elements may be connected to respective corners of the platform 102. Vertical frame elements may be connected at different locations on the platform 102, for instance if a prefabricated mobile structure is configured to house a piece of equipment at a particular corner. For example, a prefabricated mobile structure may be configured as a portable office, and include a landing with a generator positioned at a corner for easy servicing. As a result, a vertical frame element may be displaced from a corner to make room for generator.

The prefabricated mobile structure 100 may also comprise a roof panel 106 with a roof frame having a substantially rectangular (e.g., rectangular) shape. The roof frame may be attached to the four vertical frame elements 104A-104D, and may be substantially parallel (e.g., parallel) to the platform 102. The frame may include a front transverse frame element 110A extending between and coupled to respective ends of a first pair of the four vertical frame elements 104A and 104B at respective roof frame corners 112A and 112B. Thus, a front edge of the platform, the first pair of vertical frame elements 104A and 104B, and the front transverse frame element 110A may define a transverse wall 120A (e.g., a front side) of the prefabricated mobile structure 100. Likewise, a rear transverse frame element, not visible in FIG. 1, may extend between and couple to respective ends of a second pair of the four vertical frame elements (104C, with 104D not visible in FIG. 1) at respective roof frame corners 112C and 112D, such that a rear edge of the platform, the second pair of vertical frame elements 104C and 104D, and the rear transverse frame element define a transverse wall 120 (e.g., a rear side, not visible in FIG. 1) of the prefabricated mobile structure 100.

Further, the roof frame may include a left longitudinal frame element 108A extending between and coupled to an end of a first vertical frame element of the first pair of vertical frame elements (e.g., vertical frame element 104A) and an end of a first vertical frame element of the second pair of vertical frame elements (e.g., vertical frame element 104C), wherein a left edge of the platform, the left longitudinal frame element 108A, the first vertical frame element of the first pair of vertical frame elements 104A, and the first vertical frame element of the second pair of vertical frame elements 104B define a left side 118A of the prefabricated mobile structure 100. Similarly, a right longitudinal frame element (e.g., 108B shown in FIG. 4) extending between and coupled to an end of a second vertical frame element of the first pair of vertical frame elements (e.g., vertical frame element 104B) and an end of a second vertical frame element of the second pair of vertical frame elements (e.g., vertical frame element 104D in FIG. 4), wherein a right edge of the platform, the right longitudinal frame element 108B, the second vertical frame element of the first pair of vertical frame elements 104B, and the second vertical frame element of the second pair of vertical frame elements 104D define a right side (118B in FIG. 4) of the prefabricated mobile structure 100. In some embodiments, the prefabricated mobile structure 100 may have a roof frame without a roof panel. For instance, the prefabricated mobile structure 100 may house a tank (e.g., a tanktainer), and the prefabricated mobile structure 100 may omit a roof to reduce weight.

Additionally, the prefabricated mobile structure 100 may comprise four extension members 114A-114D respectively disposed at each roof frame corner 112A-112D. The extension members may provide attachment points to engage with equipment configured to lift a container of a different base size than the prefabricated mobile structure 100. For example, the platform 102 may have dimensions adapted to fit on a CROP sled, and the extension members may provide attachment points (e.g., twist lock apertures) for a crane configured to lift a 20-foot (i.e., larger) container. Thus, each extension member 114A-114D may extend in a longitudinal direction beyond an adjacent transverse frame element 110 and each extension member may comprise an attachment point that will be illustrated in a subsequent figure. The extension members 114A-114D may also or alternatively extend in a transverse direction.

Further, the roof frame may have substantially equal (e.g., equal) dimensions to the platform 102, or different dimensions. Additionally, in some embodiments, the attachment points may extend beyond the platform 102. In this way, the length of a platform side may be less than the distance between attachment points on the same side of the prefabricated mobile structure 100, such that the platform 102 length may be less than a distance measured between center points of attachment points (e.g., a distance between a center point of a first attachment point corresponding to a first longitudinal frame element and a center point of a second attachment point corresponding to the first longitudinal frame element). For instance, in some embodiments, the distance may correspond to a corner fitting location distance of a type 1C container specified by ISO 668 (i.e., a 20-foot shipping container standard), while the length of the platform is so dimensioned to fit on a container roll-on/roll off platform sled (e.g., an M3 CROP sled).

Returning to FIG. 1, the prefabricated mobile structure 100 may also include one or more forklift tine apertures 116, which may extend through a side wall of the platform 102 substantially perpendicularly (e.g., perpendicularly) to a long side of the platform. In particular embodiments, the prefabricated mobile structure 100 includes two forklift tine apertures 116 that may be symmetric about a centerline of the platform. One or more of the forklift tine apertures 116 may be configured to receive a tine of a forklift for lifting or relocating the prefabricated mobile structure 100, such that a forklift may approach the shipping container 100 from the long side, lift, and transport the prefabricated mobile structure 100. In some embodiments, the forklift tine apertures 116 may extend through the entire platform 102. Further, the prefabricated mobile structure 100 may have forklift tine apertures 116 on all four sides (e.g., two corresponding forklift tine apertures 116 on each of the prefabricated mobile structure's four sides) to allow greater mobility in tight conditions.

Further, in some embodiments such as that shown in FIG. 1, the prefabricated mobile structure 100 may also include two longitudinal walls 118A (with 118B not visible in FIG. 1). In certain embodiments, the prefabricated mobile structure 100 may have one, two, three, or four, or any other suitable number of such walls as required to meet an intended need. For example, a prefabricated mobile structure 100 may be used as a rapidly deployable office space, and may include four walls to provide a heated and cooled interior for workers. Alternatively, a prefabricated mobile structure 100 may function as an equipment depot, and omit a longitudinal wall to allow people and equipment to freely access items inside. In some embodiments, the prefabricated mobile structure 100 may comprise a door, as well. As shown in FIG. 1, the door may be disposed in a front end 120 of the prefabricated mobile structure 100. The door may be a hinged ingress point for a person, a roll up door to allow access to large items stored in the container, or any other suitable door. Further, in some embodiments, the prefabricated mobile structure 100 walls may hold utility units, such as an air conditioner, a power conditioner, a communications routing box, an air purifier, or storage compartment. In this manner, a prefabricated mobile structure 100 may function as a turnkey portable workspace.

In particular embodiments, the prefabricated mobile structure 100 comprises an interior configured for battery charging and storage and the interior comprises a plurality of shelves sized to receive a plurality of batteries, and a plurality of electrical connections positioned at a plurality of positions of the plurality of shelves, each electrical connection configured to attach to a battery of the plurality of batteries and to deliver an electrical signal from an external power source to the battery.

In various embodiments, the prefabricated mobile structure 100 is adapted to function as a robust building-like structure that offers turnkey functionality either hooked up to an electrical source from a building, or to a generator, most anywhere in the world with minimal setup time. In particular embodiments, the structure can function like a small facility for use as a command, operations, communications, and/or mobile meeting space. In certain embodiments, the prefabricated mobile structure 100 may have a building-like design that facilitates accommodating the heavy equipment needed for various mobile maintenance applications. Because, in various embodiments, it can be picked up and transported as described above, it can also house activities that, due to hazards or other concerns, need to be separated from permanent structures, or activities that need to be conducted in different geographical locations to supply the function efficiently. In various embodiments, the prefabricated mobile structure 100 is configured for use in one or more particular fields including, for example, the medical field, construction, film, disaster relief, oil or gas exploration, industrial sitework or maintenance, and/or housing or moving remote equipment and supplies.

Figure 2:
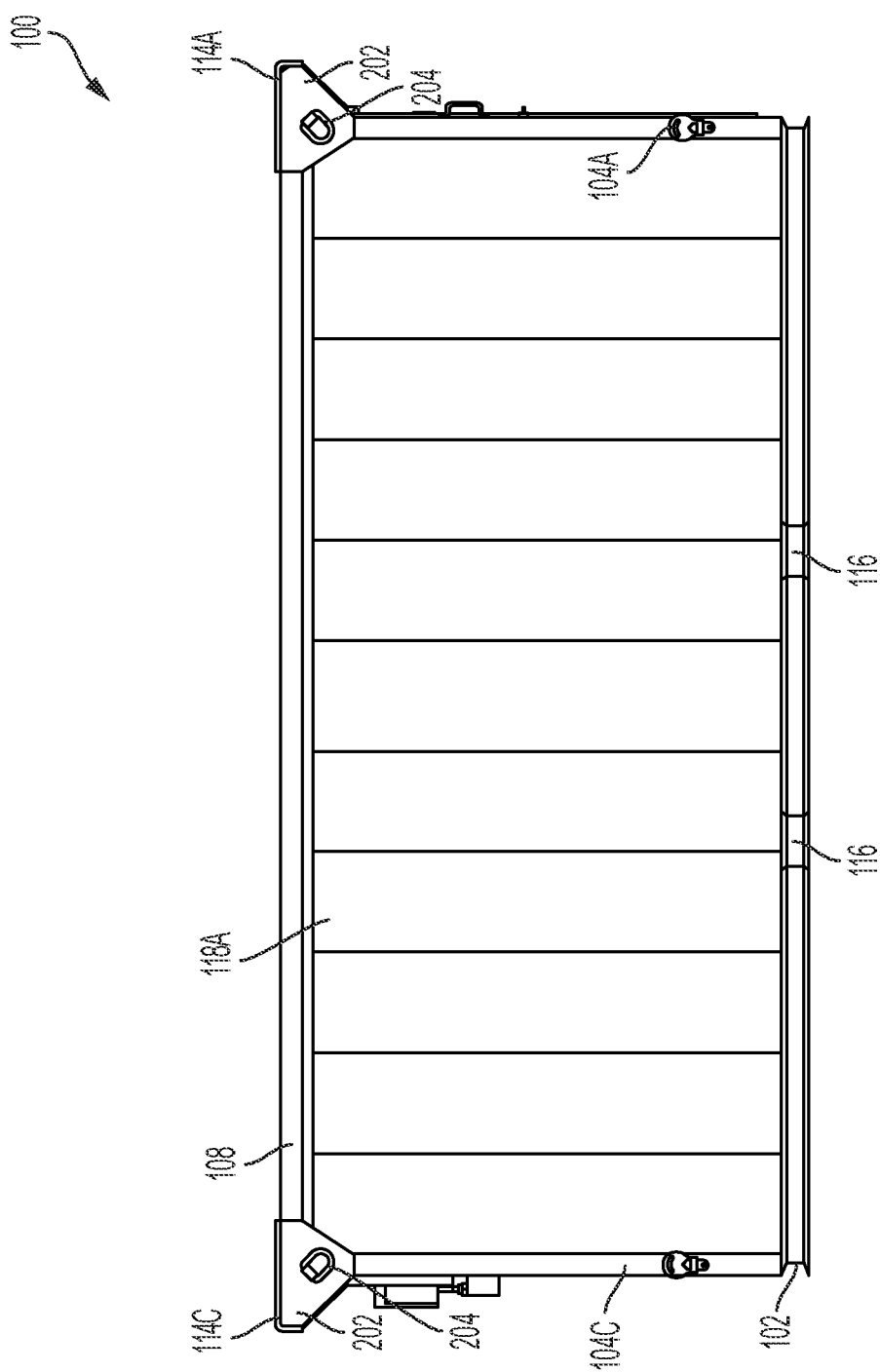
FIG. 2 is a side view of the prefabricated mobile structure of FIG. 1.

FIG. 2 is a side view of the prefabricated mobile structure 100 of FIG. 1. As stated above and more clearly illustrated by the side view, the extension members 114 (e.g., extension members 114A and 114C visible in FIG. 2) of the prefabricated mobile structure 100 may extend beyond the edges of the platform 102. This overhang may allow engagement with equipment that could not otherwise attach to a prefabricated mobile structure 100 due to dimension differences. Further, as stated above, a prefabricated mobile structure 100 may be required to hold large weights (e.g., more than 20,000 lbs.). Therefore, the respective extension members 114 may each be structurally supported by one or more gussets 202 connecting the respective extension member 114 to a respective vertical frame element 104 adjacent the respective extension member 114. These gussets 202 may help counteract bending moments on the extension members 114 caused by a load force from the vertical frame element 104 and a lifting force at an attachment point (e.g., defined by the respective extension member 114) not being coaxial. The gussets 202 may help prevent deformation of the extension members 114, extending the serviceable lifetime of the prefabricated mobile structure 100. The gussets 202 may be exterior gussets that mate against an exterior surface of a respective adjacent vertical frame element 104. Further, as shown in FIG. 1, the prefabricated mobile structure 100 may include one or more tie down anchors 204 which may be disposed, for instance, on an exterior surface of one or more of (e.g., each of) the plurality of gussets 202. This may enable, for example, securing the prefabricated mobile structure 100 to a foundation at a destination, or securing the prefabricated mobile structure 100 to shipping equipment (e.g., a CROP sled) to prevent tipping.

Figure 3:
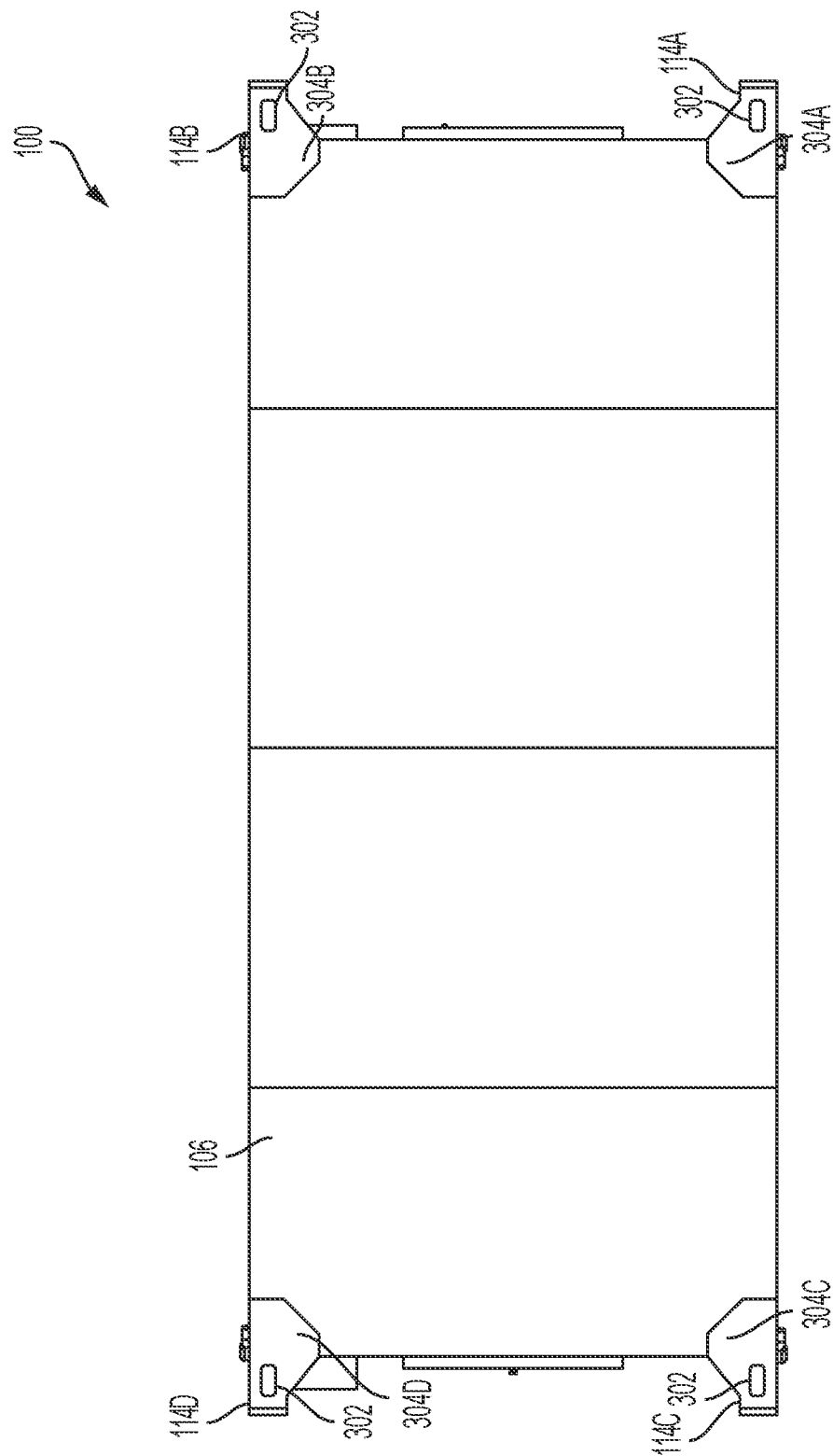
FIG. 3 is a top view of the prefabricated mobile structure of FIG. 1.

FIG. 3 is a top view of the prefabricated mobile structure 100 of FIG. 1. In this view, the respective attachment points 302 on each extension member 114A-114D are more clearly visible. Further, as stated above, in some embodiments, one or more of the respective attachment points 302 may lie outside of the horizontal profile (e.g., footprint) of the platform 102. The attachment points may accept and secure respective twist lock mechanisms (or other suitable lock mechanisms), and may therefore be dimensioned according to certain standards. Additionally, the prefabricated mobile structure 100 may include top gussets 304 connecting the extension members 114 to the prefabricated mobile structure's roof frame. The top gussets 304 may have a substantially trapezoidal shape or any other suitable shape. For instance, a short, horizontal side of the trapezoidal shape may have a length substantially equal (e.g., equal) to a width of a transverse frame element 110. The top gusset may mate with a top surface of an adjacent transverse frame element, for example. These top gussets 304 may help transfer side loads on the extension members 114A-114D to the roof frame, thereby strengthening the extension members 114A-114D against possible bending moments which may misalign the attachment points 302 and thereby cause the prefabricated mobile structure 100 to be unable to connect to lifting equipment. The top gussets 304 may also further reinforce the extension members 114A-114D against upward bending moments caused by lifting forces.

In some embodiments, additional attachment points 302 may be cut into frame elements as well (e.g., an opening in a frame element plus the material adjacent and defining the opening may be considered an attachment point). In this manner, the prefabricated mobile structure 100 may be lifted by multiple pieces of equipment designed according to different standards, for example, equipment designed to lift a 20-foot container, as well as equipment designed to lift a container dimensioned to fit on a CROP sled.

Figure 4:
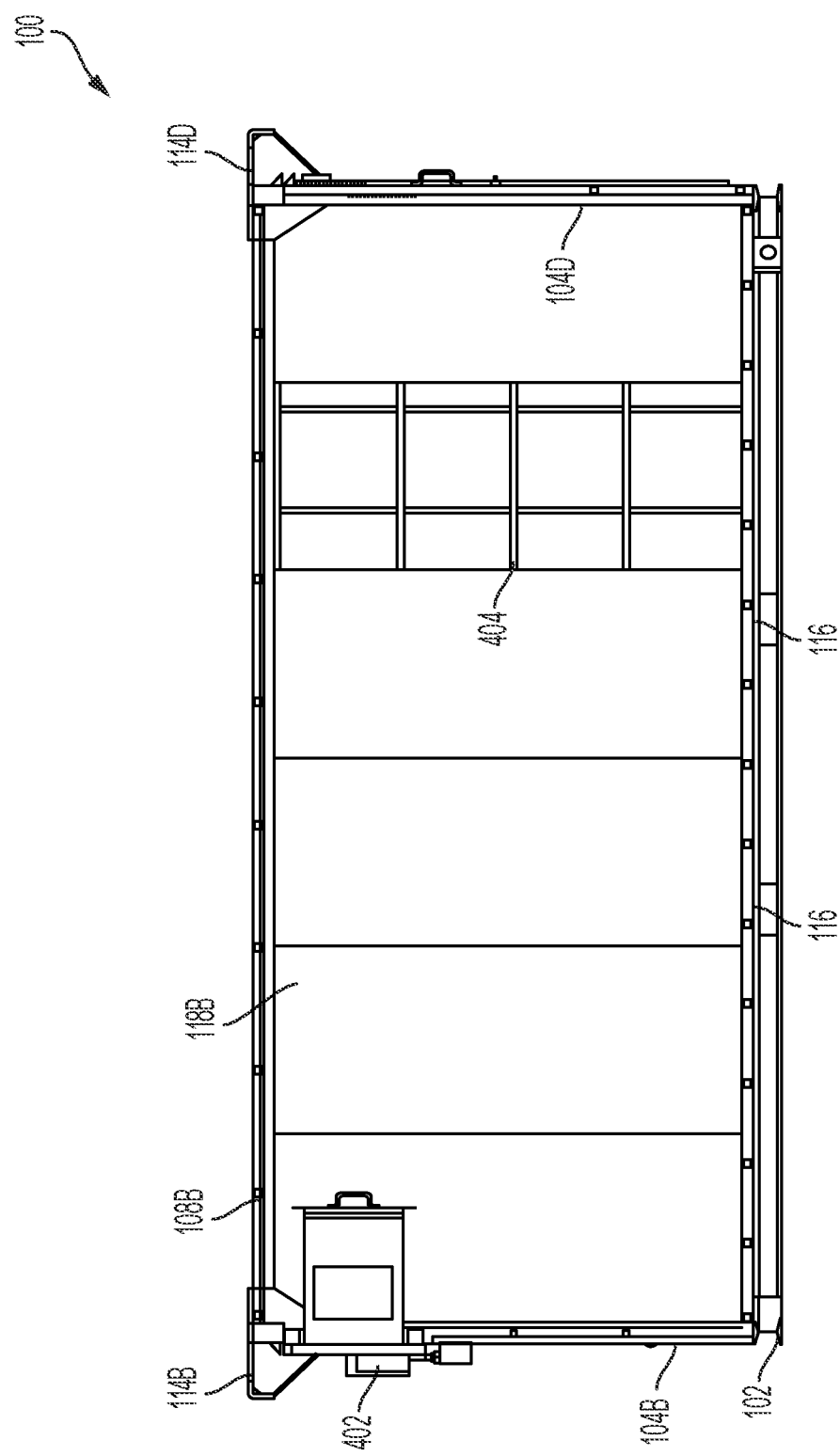
FIG. 4 is a cutaway view of the prefabricated mobile structure of FIG. 1.

FIG. 4 is a cutaway view of the prefabricated mobile structure 100 of FIG. 1. The cutaway view illustrates an interior space of the prefabricated mobile structure 100. As shown in this view, the prefabricated mobile structure 100 may house an air conditioner 402 to provide climate control of the inside of the container, for instance to allow the container to be used as a workspace, or to maintain items (e.g., heat-sensitive explosives, medicine or food) within the prefabricated mobile structure 100 at a proper temperature. The air conditioner 402 may also provide air purification, for instance in support of a clean room environment and/or to provide a safe and clean working space.

In some embodiments, the air conditioner 402 or other utility units may be pre-installed, such that the prefabricated mobile structure 100 may begin operating once power is connected. Alternatively, the prefabricated mobile structure 100 walls may have openings configured to accept utilities, such as a vent hole, a power supply port, etc.

As shown in FIG. 4, the air conditioner 402 or other utility unit may be positioned such that it does not protrude laterally beyond the extension member 114D relative to the wall on which the air conditioner 402 is installed. Thus, a distance between a) an outer surface of the first transverse wall 120 and b) a distal end of an extension member 114 adjacent the first transverse wall 120 may be greater than a second distance between c) an outer surface of the first transverse wall 120 and d) a distal end of the utility unit. In this manner, the prefabricated mobile structure 100 may be placed end-to-end with other shipping containers, including shipping containers of different dimensions, enabling compact storage and shipping.

Additionally, equipment may be installed (e.g., pre-installed before delivery to a customer) within the walls of the prefabricated mobile structure 100 to further enable operation of the prefabricated mobile structure 100 as a workspace. For instance, as shown in FIG. 4, a storage unit 404 may be attached to an interior side of a wall (e.g., an interior side of a transverse wall 120 or an interior side of a longitudinal wall). Other pre-installed equipment is also envisioned, such as one or more cabinets, televisions, desks, phones, benches, beds, couches, chairs, or any other furnishing that may help convert the interior space into a working and living environment. Accordingly, equipment may also or alternatively secure to the platform 102 of the prefabricated mobile structure 100.

Figure 5:
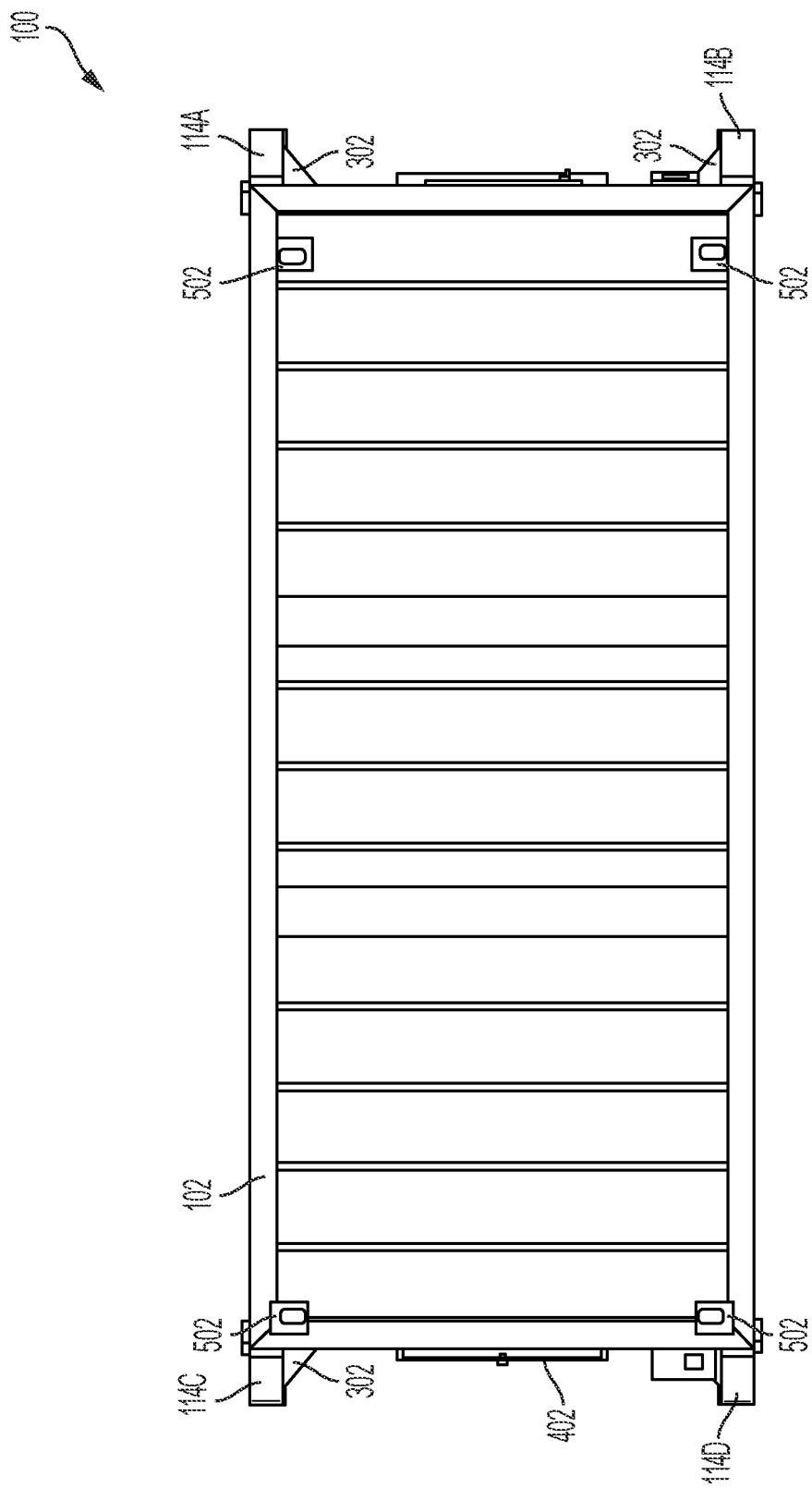
FIG. 5 is a bottom view of the prefabricated mobile structure of FIG. 1.

FIG. 5 is a bottom view of the prefabricated mobile structure 100 of FIG. 1. This bottom view of the prefabricated mobile structure 100 illustrates the bottom of the platform 102. As shown in FIG. 5, the prefabricated mobile structure 100 may also include a plurality of floor blocks 502 attached to an underside of the platform, wherein each floor block 502 comprises a substantially stadium-shaped (e.g., a rectangle capped on two opposing ends with semicircles) aperture 602 configured to accept a twist lock mechanism. The floor blocks 502 may be dimensioned so that respective bottom surfaces of the blocks are substantially coplanar (e.g., coplanar) with a bottom surface of the platform. The floor blocks 502 may be positioned substantially symmetrically (e.g., symmetrically) about a line of symmetry of the platform 102 (e.g., a center line). The placement of the floor blocks 502 on the platform 102 may at least substantially correspond (e.g., correspond) to attachment points on a CROP sled, or may at least substantially correspond to placement of attachment points for a container or other object that complies with a different standard (e.g., a 10-foot container standard). In some embodiments, multiple sets of floor blocks 502 may be attached to the underside of the platform 102, with each set being positioned to engage with equipment configured according to different standards (e.g., the prefabricated mobile structure 100 may comprise a first set of floor blocks 502 that are positioned for use with a CROP sled and a different set of floor blocks 502 that are positioned for use with a standard 10-foot container).

Figure 6:
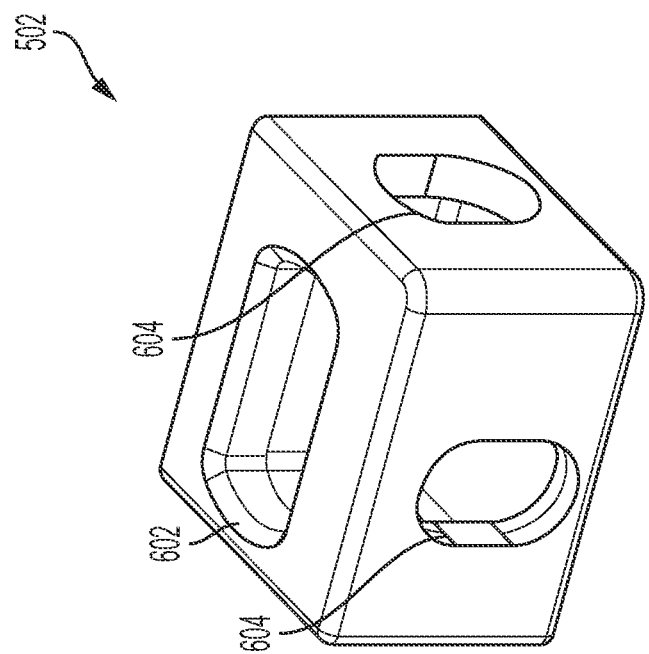
FIG. 6 is a top front perspective view of a floor block of the prefabricated mobile structure of FIG. 1.

FIG. 6 is a top front perspective view of a floor block 502 of the prefabricated mobile structure 100 of FIG. 1. As may be understood from this Figure, the floor block 502 may have a substantially stadium-shaped (e.g., stadium-shaped) bottom aperture 602 dimensioned according to the ISO 668 standard, or may have any other suitable dimensions, such as dimensions suitable for engaging with one or more attachment points on a CROP sled. Additionally, the floor block 502 may include one or more side apertures 604 which may provide additional lateral securing points, for instance for a twist lock mechanism or one or more other types of attachments (e.g., bases for other utilities, antennas, etc.).

Figure 7:
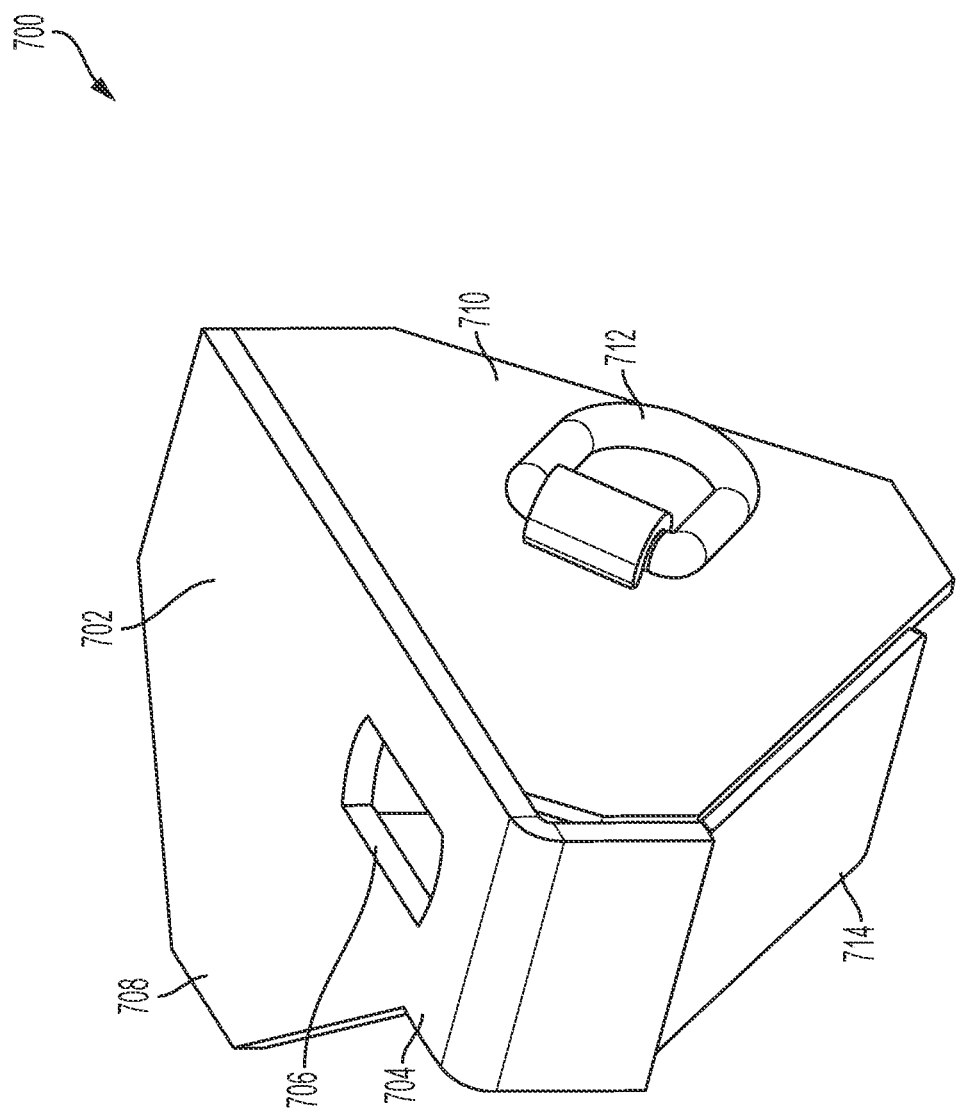
FIG. 7 is a top front perspective view of an extension horn according to various embodiments described herein. It should be understood that this extension horn corresponds generally to various embodiments of extension members 114 in FIGS. 1-5.

FIG. 7 is a top front perspective view of an extension horn 700 according to various embodiments described herein. As shown, for example, in FIG. 1, the extension horn 700 of FIG. 7 may be attached to or integrated into a prefabricated mobile structure 100, such as the prefabricated mobile structure 100. As shown in FIG. 7, the extension horn 700 may include multiple interconnected pieces (which may, for example, be made of metal or any other suitable material), such as a top plate 702, an exterior gusset 710, and a cover plate 714. In some embodiments, a tie down anchor 712 may be secured adjacent (e.g., to) an outer surface of the exterior gusset 710 (which may, for example, be substantially planar). The top plate 702 may include an extension portion 704 and define one or more attachment points 706, such as an attachment point corresponding to dimensions specified in ISO 668 and configured to accept a twist lock device or other suitable attachment mechanism. For instance, the attachment point 706 may be substantially stadium-shaped (e.g., stadium-shaped). The top plate 702 may also include a top gusset portion 708 extending away from the exterior gusset 710, as also described by reference to FIG. 3. Top gusset 708 and exterior gusset 710 may be attached to a portion of the prefabricated mobile structure's frame (e.g., a suitable vertical and/or longitudinal frame element 104, 108), for instance by welding. The exterior gusset 710 may be configured to mate against an exterior surface of a vertical frame element of a prefabricated mobile structure 100. In some embodiments, the exterior gusset 710 may be substantially perpendicularly (e.g., perpendicularly) attached adjacent (e.g., to) the top plate 702.

Figure 8:
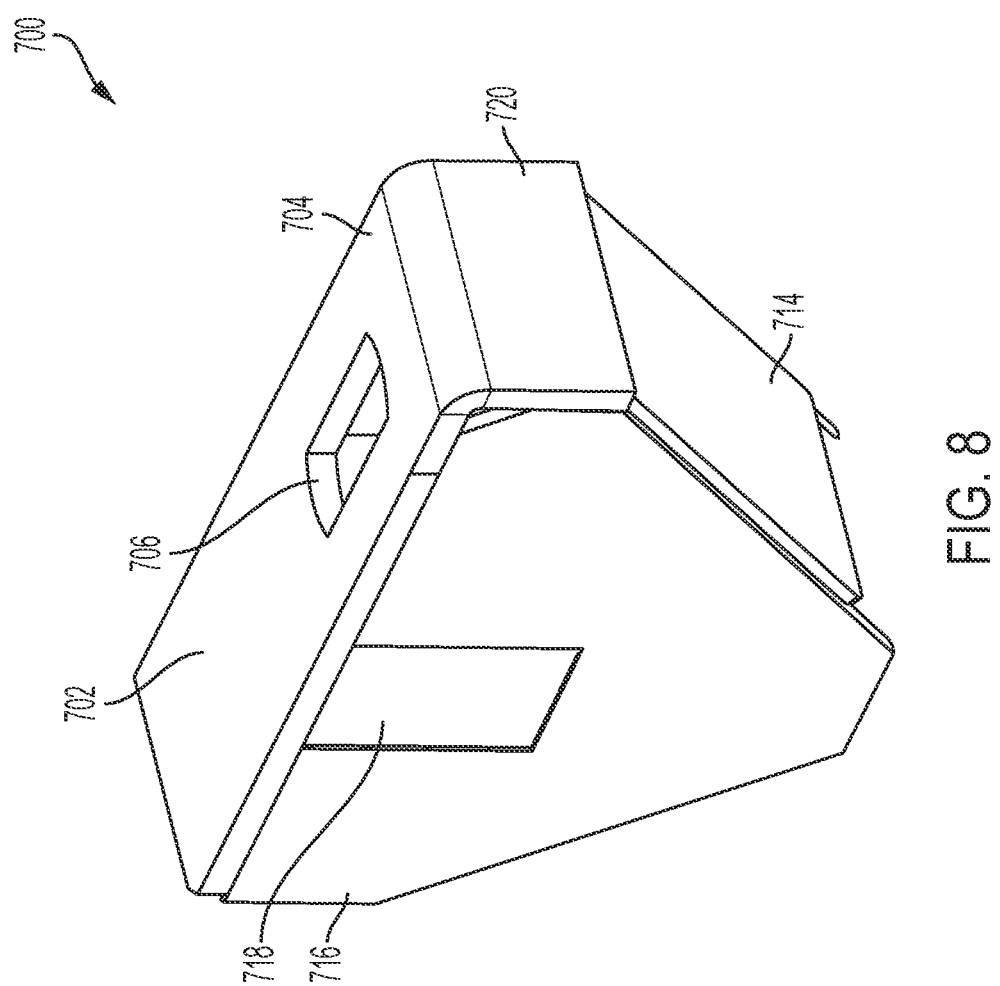
FIG. 8 is a partial cutaway perspective view of the extension horn of FIG. 7.

FIG. 8 is a partial cutaway perspective view of the extension horn 700 of FIG. 7. In FIG. 8, the top gusset 708 of the extension horn 700 has been hidden in order to view an interior gusset 716 (which may be, for example, substantially planar) of the extension horn 700. The interior gusset 716 may be substantially perpendicularly (e.g., perpendicularly) attached adjacent (e.g., to) the top plate 702, and may also be disposed substantially parallel (e.g., parallel) to the exterior gusset 710. The interior gusset 716 may be substantially shaped as a trapezoid joined to a rectangle along its long (e.g., base) side. The short side of the trapezoidal shape may have a length substantially equal (e.g., equal) to a vertical frame element 104. In some embodiments, the interior gusset 716 may define a cutout portion forming a frame aperture 718, and may be configured to mate against an interior surface of a vertical frame element 104 of the prefabricated mobile structure 100. The frame aperture 718 may be defined by edges of the interior gusset 716, and may be dimensioned so as to secure against an outer surface of a horizontal (e.g., transverse) support element of the prefabricated mobile structure 100 (e.g., transverse frame element 110). For instance, the horizontal support element may be disposed in a direction substantially perpendicular (e.g., perpendicular) to the interior gusset 716. Additionally, in an installed state, the interior gusset 716 may connect an extension member (e.g., the extension horn 700) to a vertical frame element 104 adjacent the extension member. The interior gusset 716 may also mate against an interior surface of an adjacent vertical frame element 104, such that the vertical frame element is "sandwiched" between the interior gusset 716 and the exterior gusset 710. In this manner, the interior gusset 716 may help counteract bending moments provided by lifting forces at an attachment point 706 by transferring force to a vertical frame element 104, as well as by transferring torsional resistance moments provided by a transverse frame element 110 secured in the frame aperture 718 to the extension portion 704.

Further, FIG. 8 illustrates that the extension horn 700 may also comprise a cover plate 714 and an end plate 720. The cover plate 714 and the end plate 720 may help protect the extension horn 700 from damage due to collisions and corrosion by reinforcing the end of the extension horn 700 against impacts with adjacent prefabricated mobile structures and also reducing the amount of water and sand that may contact welds securing the exterior gusset 710 and the interior gusset 716 to the frame of the prefabricated mobile structure 100. As shown in FIG. 8, the cover plate 714 may be attached substantially perpendicularly (e.g., perpendicularly) adjacent (e.g., to) an edge of an adjacent interior gusset 716 and attached substantially perpendicularly (e.g., perpendicular) to an edge of an adjacent exterior gusset 710. Additionally, the cover plate 714 may be shorter than both adjacent edges of the interior and exterior gussets 716, 710 (i.e., the cover plate may have a length less than an adjacent edge of the adjacent interior gusset 716 and less than a length of an adjacent edge of the adjacent exterior gusset 710). Thus, an edge of the cover plate 714, together with a portion of the edge of the interior gusset 716 and a portion of the edge of the exterior gusset 710, may define a drainage aperture adjacent a bottom end of the extension horn 700. Further, the end plate 720 may be secured substantially perpendicularly (e.g., perpendicularly) to the top plate 702 and substantially perpendicularly (e.g., perpendicularly) to the exterior gusset 710. As a result, the end plate 720 may be substantially parallel (e.g., parallel) to an end wall of a prefabricated mobile structure 100 in a particular installed state, for instance. In this manner, the extension horn 700 may be protected from impacts and corrosive fluids, which could lead to cracks and possible material failure.

Figure 9:
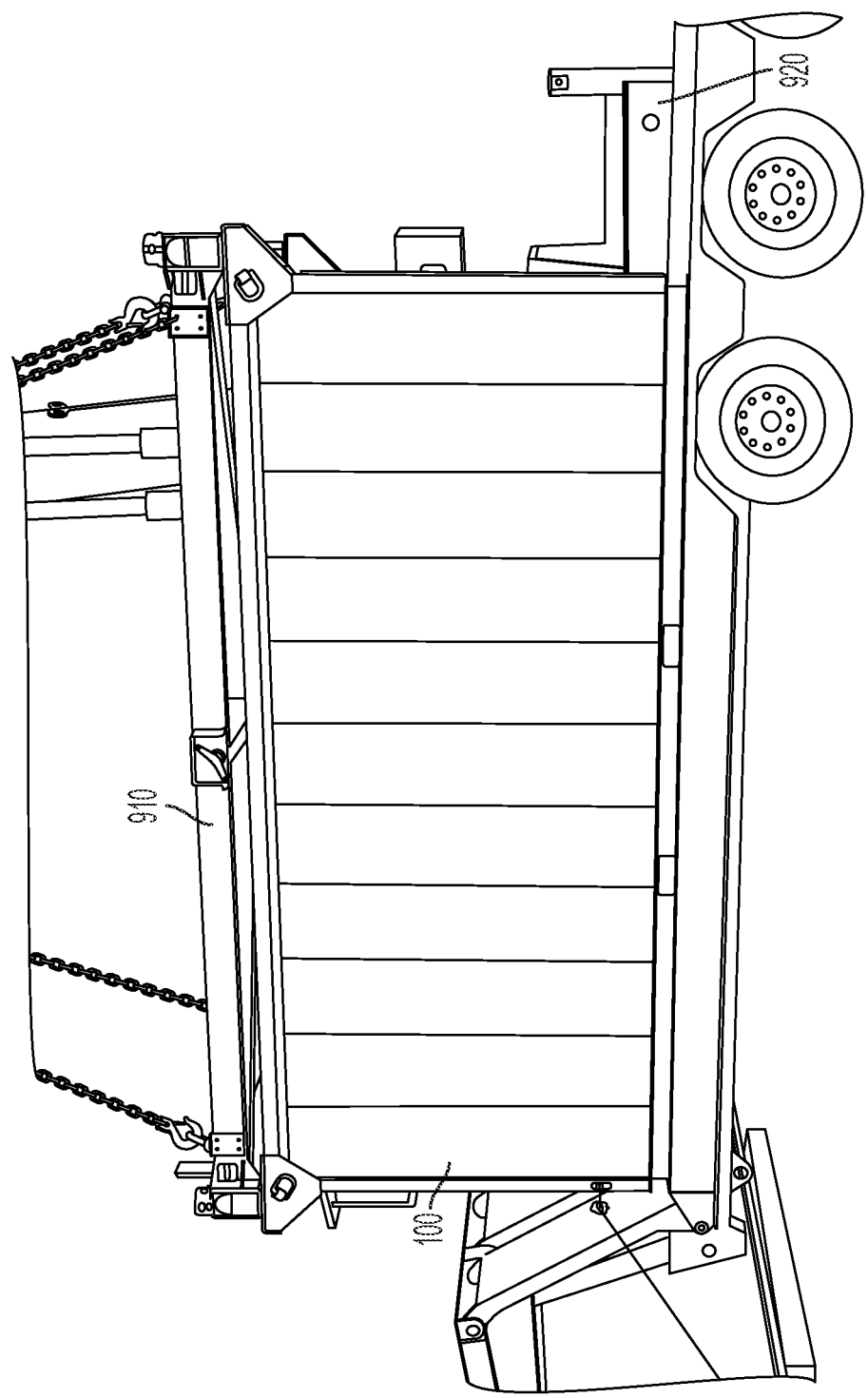
FIG. 9 illustrates an exemplary transportation mode of the prefabricated mobile structure of FIG. 1.

FIG. 9 illustrates an exemplary transportation mode of the prefabricated mobile structure 100 of FIG. 1. In FIG. 9, a prefabricated mobile structure 100 is in the process of being lifted by a crane using a spreader 910. The spreader 910 may dimensionally follow standards for a standard large container, such as a 20-foot container, but nonetheless may be able to lift the prefabricated mobile structure 100 by connecting to attachment points defined by the respective extension members 700. As can be seen from FIG. 9, the spreader 910 may be unable to attach to the prefabricated mobile structure 100 without extension members 700 providing the attachment points at locations compatible with the dimensions of the spreader 910. In this manner, a crane designed to move larger containers may still lift the prefabricated mobile structure 100 and place the prefabricated mobile structure 100 on a trailer 920, which itself may (or may not) be designed for larger containers as well. The extension members 700 of the prefabricated mobile structure 100 may also permit the prefabricated mobile structure 100 to be lifted from a long side of the prefabricated mobile structure 100, while a trailer or truck may approach from a short side of the prefabricated mobile structure 100 (e.g., substantially perpendicular (e.g., perpendicular) to the crane). This may allow for quick unloading of multiple prefabricated mobile structures 100 in a high-throughput transit station.

Figure 10:
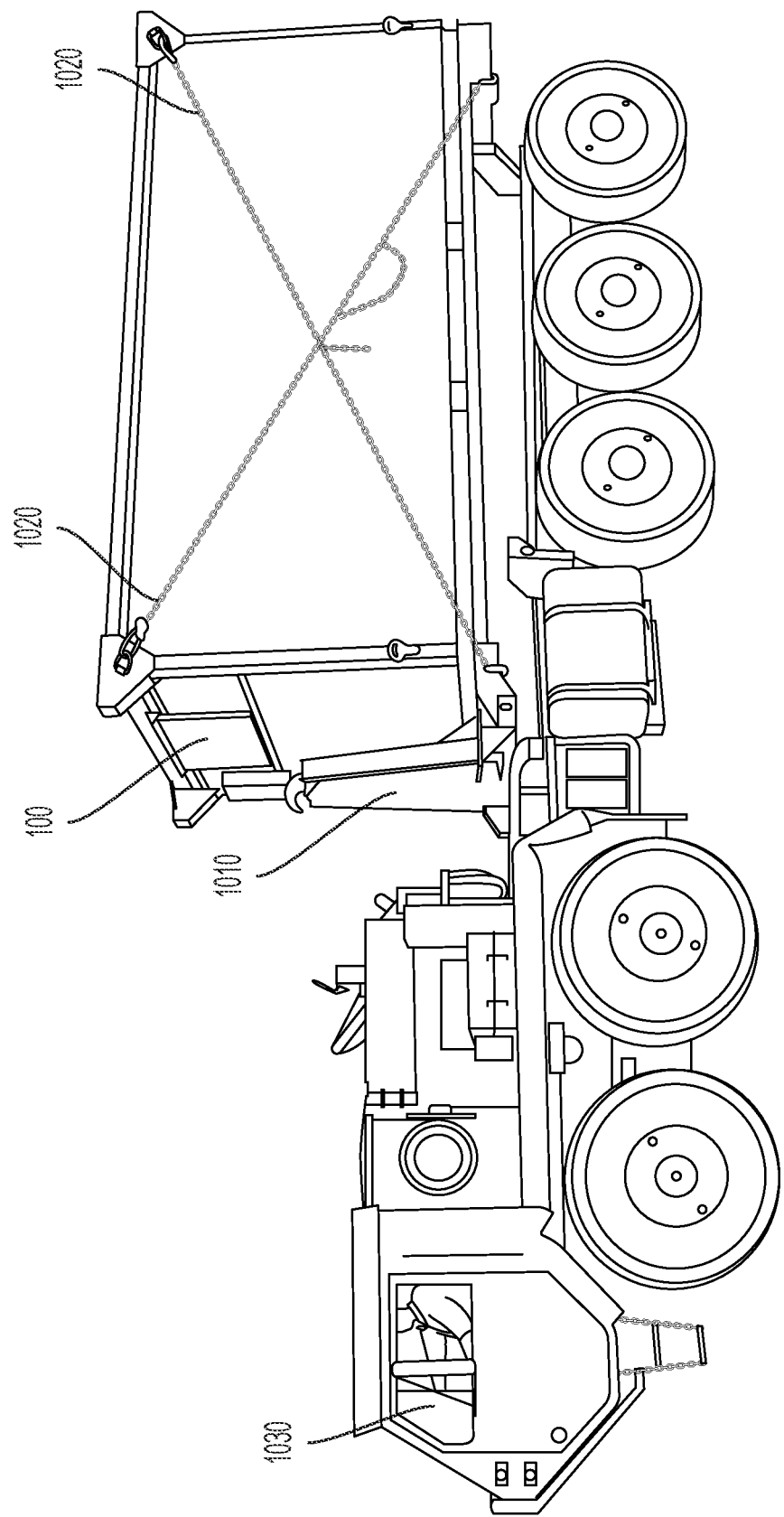
FIG. 10 illustrates a further exemplary transportation mode of the prefabricated mobile structure of FIG. 1.

FIG. 10 also illustrates an exemplary transportation mode of the prefabricated mobile structure 100 of FIG. 1. In FIG. 10, the prefabricated mobile structure 100 has been placed onto a sled 1010, for instance by a crane or a forklift engaging with the forklift tine apertures of the prefabricated mobile structure 100. The container 100 may also be secured adjacent (e.g., to) the sled 1010 by chains or ropes 1020 secured to one or more tie down anchors 204 of the prefabricated mobile structure 100. The sled 1010 may enable rapid loading and unloading of the prefabricated mobile structure 100 from the truck 1030, without a need for ancillary equipment (e.g., cranes).

Figure 11:
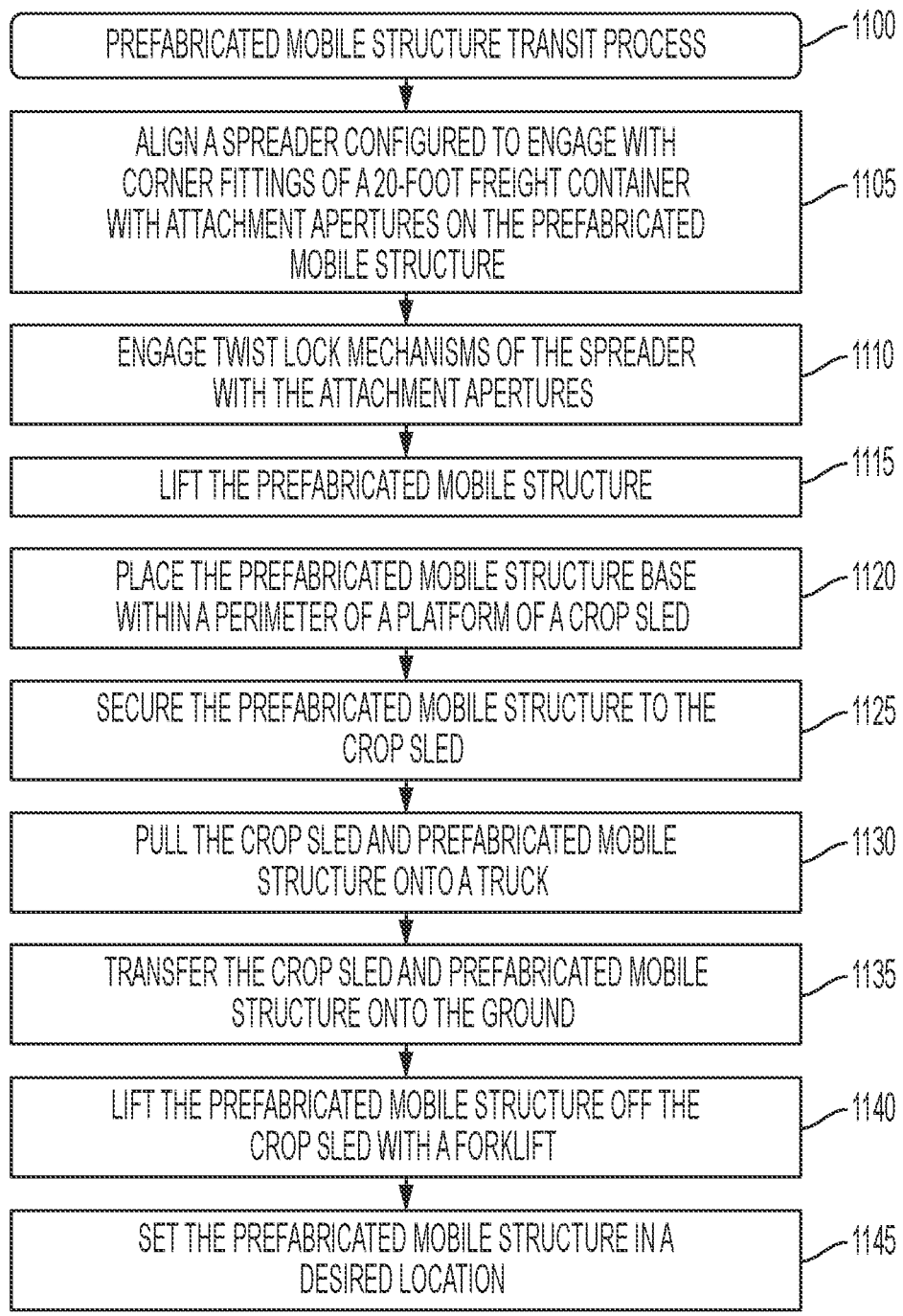
FIG. 11 illustrates a transit process of a prefabricated mobile structure according to various embodiments described herein.

FIG. 11 illustrates a transit process of a prefabricated mobile structure 100 according to various embodiments described herein. This transit process 1100 may be used to ship a prefabricated mobile structure 100 between an origin and a destination using multiple pieces of equipment configured to correspond to potentially different dimensional standards.

The transit process 1100 begins at step 1100 with aligning a spreader configured to engage with corner fittings of a standard 20-foot freight container (or other suitable container) with corresponding attachment points on the prefabricated mobile structure 100 and then engaging one or more twist lock mechanisms (or other suitable attachment mechanisms) of the spreader with one or more respective attachment points of the prefabricated mobile structure 100 100. In a particular example, the spreader may be built to ISO 668 standards and have twist lock mechanisms installed at locations specified by the ISO 668 standard. The transit process 1100 continues to step 1110 to engage twist lock mechanisms of the spreader with respective attachment points of the prefabricated mobile structure 100, followed by lifting the prefabricated mobile structure 100 at step 1115. At this step, the prefabricated mobile structure 100 may be lifted off of a sled, ship, trailer, the ground, etc., by a crane, such as an overhead crane, container crane, or other suitable machinery.

Next, at step 1120, the base of the prefabricated mobile structure 100 is placed within a perimeter of a platform of a container roll-on/roll-off platform (CROP) sled, such as an M3 CROP sled. The CROP sled may, for example, be carried by a truck or other vehicle, or may be on the ground. In some cases, a crane may lift and place the prefabricated mobile structure 100 on the ground, and a separate machine (e.g., a forklift) may move the prefabricated mobile structure 100 onto a CROP sled at a later time. Once the prefabricated mobile structure 100 is on the CROP sled, the prefabricated mobile structure 100 may be secured to the CROP sled at step 1125. Step 1125 may include, for instance, inserting a respective twist lock mechanism (e.g., of the CROP sled) into a substantially stadium-shaped (e.g., stadium-shaped) aperture 602 of each of a plurality of floor blocks 502 attached to an underside of the prefabricated mobile structure 100; and engaging each twist lock mechanism to secure the prefabricated mobile structure 100 to the CROP sled. Alternatively or additionally, step 1125 may include attaching a first end of a tensioning system (e.g., chain) to a tie down anchor disposed on an outer surface of the prefabricated mobile structure 100 and attaching a second end of the tensioning system to an attachment point on the CROP sled. This may be followed by tensioning the tensioning system to secure the prefabricated mobile structure 100 to the CROP sled. With the prefabricated mobile structure 100 secured to the CROP sled, the CROP sled with the prefabricated mobile structure 100 may be pulled onto a truck or other vehicle at step 1130. The vehicle may then be driven to a suitable destination.

Once at the destination, at step 1135, the CROP sled and prefabricated mobile structure 100 are transferred onto the ground. Step 1135 may, for example, be performed using a lifting mechanism that is configured to first engage with the CROP sled and then slide the CROP sled off of the truck. Alternatively, the prefabricated mobile structure 100 may be disengaged from the CROP sled and lifted off of the CROP sled using a forklift or other suitable device, including a crane engaging with one or more attachment points of the prefabricated mobile structure 100. Further, the prefabricated mobile structure 100 may be lifted off of the CROP sled at step 1140 with the tines of a forklift engaging with respective support portions defining respective forklift tine apertures of the prefabricated mobile structure 100 at step 1140. With the prefabricated mobile structure 100 lifted off of the CROP sled, the CROP sled may be reused to transport another container, such as another prefabricated mobile structure 100. In some embodiments, the prefabricated mobile structure 100 may be lifted off of the sled using the prefabricated mobile structure's attachment points as support points. At step 1145, the prefabricated mobile structure 100 may then be placed in a desired location. In various embodiments, the transit process 1100 may also include attaching utilities (e.g., an electrical power source, a communications line, a conditioned air supply line, water, etc.) to respective ports on the prefabricated mobile structure 100, thereby enabling the prefabricated mobile structure 100 to quickly begin operation as a rapidly deployable working space.

CONCLUSION

It should be understood that various aspects of the system described above may be applicable to other types of systems, in general. Also, while various embodiments of the prefabricated mobile structure 100 are described above as being prefabricated, it should be understood that, in various embodiments, the mobile structure may not be prefabricated.

While this specification contains many specific embodiment details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A prefabricated mobile structure comprising:
a platform having a substantially rectangular shape;
four vertical frame elements attached to the platform and extending upward relative to the platform;
a roof frame having a substantially rectangular shape, attached to the four vertical frame elements, disposed substantially parallel to the platform, and comprising:
 a front transverse frame element extending between and coupled to respective ends of a first pair of the four vertical frame elements at respective front roof frame corners, wherein a front edge of the platform, the first pair of vertical frame elements, and the front transverse frame element define a front side of the prefabricated mobile structure;
 a rear transverse frame element extending between and coupled to respective ends of a second pair of the four vertical frame elements at respective rear roof frame corners, wherein a rear edge of the platform, the second pair of vertical frame elements, and the rear transverse frame element define a rear side of the prefabricated mobile structure;
 a left longitudinal frame element extending between and coupled to an end of a first vertical frame element of the first pair of vertical frame elements and an end of a first vertical frame element of the second pair of vertical frame elements, wherein a left edge of the platform, the left longitudinal frame element, the first vertical frame element of the first pair of vertical frame elements, and the first vertical frame element of the second pair of vertical frame elements define a left side of the prefabricated mobile structure; and
 a right longitudinal frame element extending between and coupled to an end of a second vertical frame element of the first pair of vertical frame elements and an end of a second vertical frame element of the second pair of vertical frame elements, wherein a right edge of the platform, the right longitudinal frame element, the second vertical frame element of the first pair of vertical frame elements, and the second vertical frame element of the second pair of vertical frame elements define a right side of the prefabricated mobile structure; and
four extension members respectively disposed at each front roof frame corner and each rear roof frame corner, wherein:
 each extension member extends in a longitudinal direction beyond an adjacent transverse frame element; and
 each extension member comprises an attachment point; and
 a front two of the four extension members extend outwardly relative to a front side of the prefabricated mobile structure so that the front two extension members extend substantially beyond the front side of the prefabricated mobile structure; and
 a rear two of the four extension members extend outwardly relative to a rear side of the prefabricated mobile structure so that the rear two extension members extend substantially beyond the rear side of the prefabricated mobile structure.

2. The prefabricated mobile structure of claim 1, further comprising a plurality of gussets, wherein each gusset attaches a respective one of the extension members adjacent a respective one of the vertical frame elements.

3. The prefabricated mobile structure of claim 2, wherein:
the plurality of gussets are exterior gussets, wherein each respective exterior gusset mates against an exterior surface of a respective adjacent one of the vertical frame elements; and
the prefabricated mobile structure further comprises a plurality of tie down anchors, each being attached to a respective one of the plurality of exterior gussets.

4. The prefabricated mobile structure of claim 3, further comprising a plurality of interior gussets, wherein each interior gusset:
connects a respective one of the extension members to a respective one of the vertical frame elements that is adjacent the extension member;
mates against an interior surface of a respective adjacent one of the vertical frame elements; and
defines an aperture configured to receive an adjacent one of the transverse frame elements.

5. The prefabricated mobile structure of claim 4, further comprising a plurality of cover plates, wherein, for each cover plate:
the cover plate is attached to an edge of a particular adjacent one of the interior gussets and an edge of a particular adjacent one of the exterior gussets;
the cover plate has a length less than an adjacent edge of the particular adjacent interior gusset; and
the cover plate has a length less than an adjacent edge of the particular adjacent exterior gusset.

6. The prefabricated mobile structure of claim 1, wherein each extension member comprises a top gusset mating against a top surface of a respective adjacent one of the transverse frame elements.

7. The prefabricated mobile structure of claim 1, wherein the attachment point is configured to accept a twist lock attachment mechanism.

8. The prefabricated mobile structure of claim 1, wherein a length of the platform is less than a distance measured between:
a center point of a first attachment point corresponding to a first respective longitudinal frame element; and
a center point of a second attachment point corresponding to the first respective longitudinal frame element.

9. The prefabricated mobile structure of claim 1, wherein the platform comprises a plurality of forklift tine apertures extending substantially perpendicularly to a long side of the platform, each forklift tine aperture configured to receive a respective tine of a forklift for lifting or relocating the prefabricated mobile structure.

10. The prefabricated mobile structure of claim 1, further comprising:
at least two longitudinal walls;
at least two transverse walls; and
a utility unit disposed on a first one of the transverse walls, the utility unit comprising at least one of:
an air conditioner;
a power conditioner;
a communications routing box;
an air purifier; or
a storage compartment.

11. The prefabricated mobile structure of claim 10, wherein:

a first distance between:
  an outer surface of the first transverse wall; and
  a distal end of a respective one of the extension members adjacent the first transverse wall;
exceeds a second distance between:
  an outer surface of the first transverse wall; and
  a distal end of the utility unit.

12. The prefabricated mobile structure of claim 10, further comprising at least one storage unit attached to at least one of an interior side of at least one of the transverse walls or an interior side of at least one of the longitudinal walls.

13. The prefabricated mobile structure of claim 10, further comprising a plurality of floor blocks attached adjacent an underside of the platform, wherein each floor block comprises a substantially stadium-shaped aperture configured to accept a fastening mechanism.

14. The prefabricated mobile structure of claim 1, wherein:
  the four vertical frame elements form respective corner edges of a body portion of the prefabricated mobile structure;
  the length of the body portion is sized to allow the body to be loaded onto a deck of a container roll-on/roll-off platform sled having a length of less than 18.5 feet; and
  the prefabricated mobile structure's extension members are sufficiently long to allow the prefabricated mobile structure to be lifted by a spreader that is configured to engage with corner fittings of a standard 20-foot container.

15. The prefabricated mobile structure of claim 1, wherein:
  the four vertical frame elements form respective corner edges of a body portion of the prefabricated mobile structure;
  the body portion is substantially shorter than that of a standard 20-foot shipping container; and
  the prefabricated mobile structure's extension members are sufficiently long to allow the prefabricated mobile structure to be lifted by a spreader that is configured to engage with corner fittings of a standard 20-foot container.

16. A method of moving a prefabricated mobile structure, comprising:
  aligning a spreader configured to engage with corner fittings of a 20-foot freight container to connect with respective attachment points on the prefabricated mobile structure;
  engaging attachment mechanisms of the spreader with the attachment points of the prefabricated mobile structure;
  lifting the prefabricated mobile structure;
  placing the prefabricated mobile structure base within a perimeter of a platform of a container roll-on/roll-off platform (CROP) sled;
  securing the prefabricated mobile structure to the CROP sled;
  transferring the CROP sled and prefabricated mobile structure onto a vehicle; and
  using the vehicle to transport the prefabricated mobile structure to a suitable location, wherein the prefabricated mobile structure comprises:
    a body portion that is substantially in the shape of a rectangular prism, the longest side of the body portion having a length that is shorter than that of a standard 20-foot shipping container; and
    at least two extension members that extend substantially beyond a front or rear face of the prefabricated mobile structure, each of the at least two extension members comprising one of the attachment points of the prefabricated mobile structure, where the at least two extension members extend far enough beyond the front or rear face of the prefabricated mobile structure to allow the attachment mechanisms of the spreader to connect with the attachment points.

17. The method of claim 16, further comprising:
  at the suitable location, transferring the CROP sled and prefabricated mobile structure onto the ground;
  removing the prefabricated mobile structure from the CROP sled; and
  placing the prefabricated mobile structure in a desired location.

18. The method of claim 16, wherein securing the prefabricated mobile structure to the CROP sled comprises, for each of a plurality of attachment mechanisms:
  inserting the attachment mechanism into a respective substantially stadium-shaped aperture of a respective floor block attached adjacent an underside of the prefabricated mobile structure; and
  while the attachment mechanism is within the aperture, engaging the attachment mechanism to facilitate securing the prefabricated mobile structure to the CROP sled.

19. The method of claim 16, wherein securing the prefabricated mobile structure to the CROP sled comprises:
  attaching a first end of a tensioning system to a tie down anchor disposed on an outer surface of the prefabricated mobile structure;
  attaching a second end of the tensioning system to an attachment point on the CROP sled; and
  tensioning the tensioning system to secure the prefabricated mobile structure to the CROP sled.

20. The method of claim 16, further comprising:
  connecting the prefabricated mobile structure to at least one of:
    an electrical power source;
    a communications line;
    a conditioned air supply line; or
    a water line.

21. The method of claim 16, wherein the at least two extension members comprise four extension members that respectively extend substantially beyond the front or rear face of the prefabricated mobile structure, each of the four extension members comprising one of the attachment points of the prefabricated mobile structure, where the four extension members extend far enough beyond the front or rear face of the prefabricated mobile structure to allow the attachment mechanisms of the spreader to connect with the attachment points.

22. A prefabricated mobile structure comprising:
  a body portion that is substantially in the shape of a rectangular prism, the longest side of the body portion having a length that is shorter than that of a standard 20-foot shipping container; and
  at least two extension members that extend substantially beyond a front or rear face of the prefabricated mobile structure, each of the at least two extension members comprising a respective attachment point of the prefabricated mobile structure, where the at least two extension members extend far enough beyond the front or rear face of the prefabricated mobile structure to allow the attachment mechanisms of a spreader configured to engage with corner fittings of a 20-foot freight container to connect with the respective attachment points on the prefabricated mobile structure so that the spreader can lift the prefabricated mobile structure.

23. The prefabricated mobile structure of claim 22, wherein the at least two extension members comprise four extension members that respectively extend substantially beyond a front or rear face of the prefabricated mobile structure, each of the four extension members comprising one of the attachment points of the prefabricated mobile structure, where the four extension members extend far enough beyond the front or rear face of the prefabricated mobile structure to allow the attachment mechanisms of the spreader to connect with the attachment points.

24. The prefabricated mobile structure of claim 22, wherein:
   the four vertical frame elements form respective corner edges of a body portion of the prefabricated mobile structure; and
   the length of the body portion is sized to allow the body to be loaded onto a deck of a container roll-on/roll-off platform sled having a length of less than 18.5 feet.

25. The prefabricated mobile structure of claim 22, wherein:
   the four vertical frame elements form respective corner edges of a body of the prefabricated mobile structure; and
   the body portion is substantially shorter than that of a standard 20-foot shipping container.

\* \* \* \* \*